United States Patent [19]

Moen

[11] Patent Number: 4,469,121

[45] Date of Patent: Sep. 4, 1984

[54] CYCLE VALVES

[75] Inventor: Alfred M. Moen, Grafton, Ohio

[73] Assignee: Stanadyne, Inc., Windsor, Conn.

[21] Appl. No.: 339,854

[22] Filed: Jan. 18, 1982

[51] Int. Cl.³ .............................................. F16K 11/02
[52] U.S. Cl. ................................. 137/100; 137/625.17; 137/625.41
[58] Field of Search ............... 137/100, 625.17, 625.41

[56] References Cited

U.S. PATENT DOCUMENTS

| 1,607,935 | 11/1926 | Ackley | 137/625.41 |
| 2,847,031 | 8/1958 | Brown, Jr. | 137/625.41 |
| 3,370,222 | 5/1973 | Moen | 137/625.17 |
| 4,033,370 | 7/1977 | Egli | 137/625.17 |

FOREIGN PATENT DOCUMENTS

1291297 10/1972 United Kingdom .......... 137/625.41

Primary Examiner—Martin P. Schwadron
Assistant Examiner—James R. Shay
Attorney, Agent, or Firm—Kinzer, Plyer, Dorn & McEachran

[57] ABSTRACT

A valve for mixing hot and cold water includes a body having hot and cold water inlets and an outlet. A rotatable non-reciprocal valve member is positioned within the body to control the mixture of hot and cold water at the body outlet. There are seal means positioned to form a seal between the body and the valve member at the inlets.

1 Claim, 20 Drawing Figures

CYCLE VALVES

SUMMARY OF THE INVENTION

The present invention relates to mixing valves, principally a mixing valve normally usable in a kitchen, lavatory, shower or a shower-tub combination. The invention is specifically directed to such a valve in which the valve control member regulates the temperature of the water, but does not control the volume. In some embodiments of the invention there may be a separate and independent control member which will regulate volume.

A primary purpose of the invention is a mixing valve, commonly referred to as a cycle valve, in which the rotatable valve member includes pressure balancing means.

Another purpose is a mixing valve of the type described in which the inlet ports are axially spaced to increase the temperature mixing range.

Another purpose is a cycle valve or mixing valve of the type described in which the valve member inlets are spaced which permits greater flexibility in valve design.

Another purpose is a mixing valve of the type described in which water modulation, e.g. the mixing of hot and cold, is downstream from the valve closing seal.

Another purpose is a cycle valve of the type described in which both hot and cold water ports are simultaneously open when the valve is operated.

Another purpose is a cycle valve of the type described having a volume control member, independent of the temperature operator, which volume control member is rotatable within the temperature control.

Another purpose is a cycle valve of the type described having in-line inlet ports, permitting a valve with reduced axial length.

Another purpose is a cycle valve of the type described in which the sealing means are carried by the rotatable valve member, spaced from the valve member inlets, and movable into register with the body or exterior sleeve member inlets to provide a valve closing seal.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

A cycle valve is known in the plumbing trade as a mixing valve which, when rotated, opens from off through cold and a mixed position to a hot temperature. It may or may not have a volume control, but if there is provision for controlling volume, it may be by a knob separate and independent from that controlling temperature. Cycle valves have been found to have particular application in residential plumbing and in a shower and/or tub configuration where conventionally the user will seldom regulate volume, but is more interested in providing the desired water temperature.

The present application illustrates a number of embodiments of cycle valves. Basically, they all operate through the use of a rotatable valve member which may be positioned within a hollow sleeve or a valve housing for example, a generally spherically-shaped chamber. There is a seal at the inlet, which seal may be mounted upon the body member or sleeve or which may be carried by the rotatable valve member itself. The volume control member, when one is present, is generally coaxially arranged with the temperature control member or valve member and is normally positioned within the valve member.

In the embodiment illustrated in FIGS. 1-4, there is a valve housing 10, which conventionally will be a casting of a suitable metal and which will contain the inlet and outlet conduits. The outlet is indicated at 12 and a cold water inlet passage is indicated at 14 and a hot water inlet passage is indicated at 16. The housing includes a somewhat cylindrical portion 18 which mounts the valve within it. A conventional operating knob 20 may be attached to the valve member as described hereinafter and there may be an escutcheon or decorative housing 22 which extends over that portion of housing 10 which will normally be visible in the plumbing installation.

Figure 1:
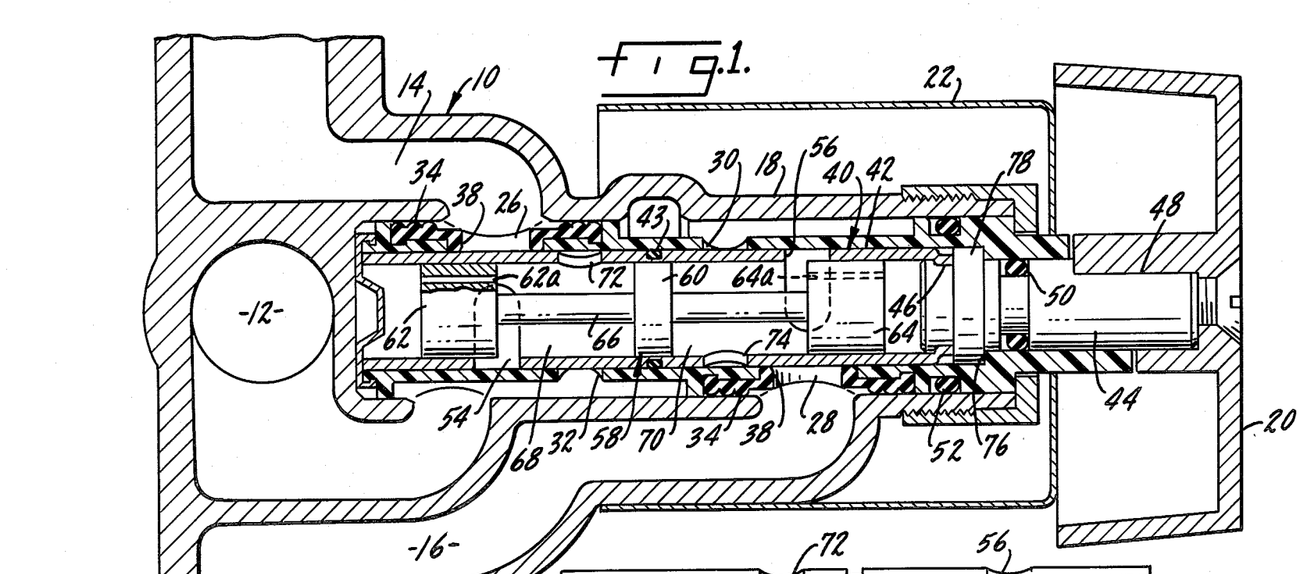
FIG. 1 is an axial section through a valve of the type described.
Figures 2, 3, 4:
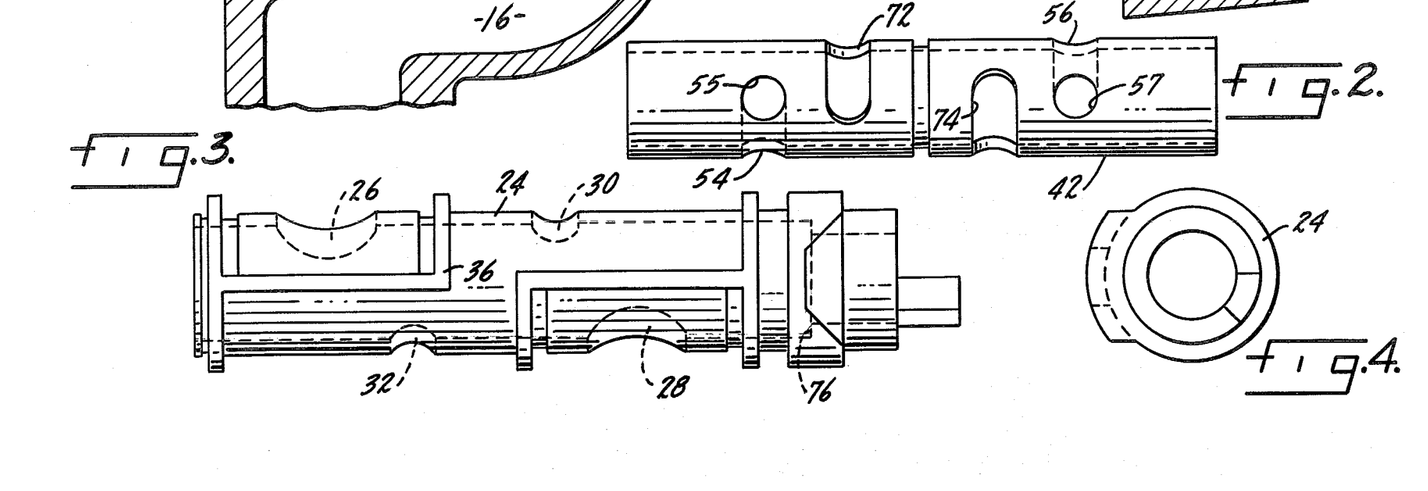
FIG. 2 is a side view of the valve member piston.
FIG. 3 is a side view of the valve member sleeve.
FIG. 4 is an end view, from the right side, of the valve sleeve of FIG. 3.

The valve itself includes an outer generally cylindrical sleeve 24, illustrated particularly in FIGS. 3 and 4, which sleeve has a cold water inlet port 26 and a hot water inlet port 28. The sleeve has outlet ports 30 and 32, both of which are in communication with a circumferential space between the exterior of sleeve 24 and the interior of housing 10, which space is in communication with outlet water passage 12.

The inlet passages or inlet ports 26 and 28 will each have a seal, which seals have been designated 34 as they are identical. Details of the seal are illustrated in U.S. Pat. No. 3,840,048. Each of seals 34 are positioned upon the exterior of sleeve 24 by means of an outwardly-extending rim or bead 36. The seals are in sealing contact with a portion of housing 10, are attached to the exterior of sleeve 24, and have a port portion indicated at 38 which extends through inlet ports 26 and 28, respectively, so that the port seal portion of the seal is in sealing contact with the interior valve member. Thus, the seals provide a valve closing seal when the valve is closed and provide a seal between the sleeve and housing.

Positioned within sleeve 24 is a valve member 40 which includes a generally hollow valve piston 42 and a stem 44 with the piston being crimped or otherwise attached, as at 46, to the stem. Stem 44 will conventionally mount knob 20 on a flattened area thereof indicated at 48 in FIG. 1. A seal ring 50 seals the exterior of the stem to the interior of the sleeve and similarly a seal ring 52 seals the exterior of the sleeve to the interior of housing 10. Piston 42 may have a groove holding a seal 43 which is in contact with the interior of sleeve 24.

Piston 42, as described, is hollow and has cold water inlet ports 54 and 55 and hot water inlet ports 56 and 57. Positioned within hollow piston 42 is a movable balancing spool 58 having a center section 60 which is connected to two end spools 62 and 64 by a generally axial rod or the like 66. End spools 62 and 64 may have vent passages 62a and 64a respectively. The spool defines two chambers, a cold water chamber 68 and a hot water chamber 70. The cold water ports open into cold water chamber 68 and the piston hot water ports open into hot water chamber 70. The piston has two outlet ports, a cold water outlet port 72 and hot water outlet port 74. Cold water outlet port 72 can be moved into register with sleeve cold water outlet 32 and piston hot water outlet port 74 can be moved into register with sleeve hot water outlet 30.

Of importance is the fact that balancing spool 58 is movable in response to differing pressures at the cold and hot water inlets. The opposite sides of center spool 60 are in communication with the inlets and differing pressures at the inlets will vary the degree of overlap between end spools 62 and 64 and the cold and hot water inlets, thereby maintaining equal hot and cold water pressure at the outlets.

The orientation of the ports is important. Assume a closed position and that the sleeve cold water inlet port 26 is located a 0° and the sleeve hot water inlet port is located at 180° and the sleeve cold water outlet is located at 180° sleeve hot water outlet is located at 0°. When the valve is closed, cold water port 54 extends from approximately 150°-300°, and port 55 extends from 75°-105°. Hot water inlet port 56 extends from 240°-30° and port 57 extends from 75°-105°. Thus, when ever the valve is moved to an open position, both hot and cold water is permitted to flow into the hot and cold water chambers. In the same valve closed position cold water outlet port 72 extends from 330°-120° and hot water outlet port 74 extends from 60°-120°. Temperature modulation will accordingly take place at the outlet ports as whenever the valve is open hot and cold water will be permitted to flow into the hot and cold water chambers and the position of the piston hot and cold water outlet ports relative to the sleeve hot and cold water outlet ports will determine the temperature of the water leaving the valve.

When the valve is moved from the closed position, cold water port 54 will first be moved into register with sleeve cold water inlet 26 and hot water port 57 will be moved into register with sleeve hot water inlet 28. At the same time as there is communication between the described valve member and sleeve inlet ports, there will be communication only between cold water outlet port 72 and sleeve outlet port 32. These particular ports are so arranged, relative to one another, that opening of the inlets places the outlet ports in communication. Continued rotation in a counterclockwise direction, which is conventionally the direction a single handle mixing faucet moves when the user desires to change from a cooler temperature to a warmer temperature, will cause sleeve outlet 30 and valve member hot water outlet 74 to register. At this time there is still communication between the cold water outlet ports. Continued rotation of the valve member in a counterclockwise direction will provide a mixed water temperature at outlet passage 12 and there will be such mixed water discharge through approximately 60° of valve rotation. Finally, continuing in a counterclockwise direction, the cold water outlets will be closed and the hot water outlets will remain open so that the user may have full hot temperature.

Valve member 40 is rotatable within sleeve 24, but is fixed against reciprocal movement. Specifically, there is a shoulder 76 at the right-hand end of sleeve 24 and there is a cooperating cylindrical portion 78 on the valve member which prevents reciprocal movement of the valve member toward the right. The innermost end of piston 42 is bottomed upon a portion of housing 10, which prevents reciprocal movement to the left. Thus, the valve is rotatable, but non-reciprocal. Rotatable movement, as described above, permits the valve to control the temperature of the water provided at outlet 12 from hot and cold water outlet ports 30 and 32, respectively. The valve is fully balanced in the open position in that spool 58 has surfaces, subject to hot and cold water pressures, which are equal in size and oppositely-positioned.

In the construction of FIGS. 5, 6, 7 and 8, major portions of the housing have been eliminated. The sleeve is indicated at 80 and has a cold water inlet port 82 and a hot water inlet port 84. Note that ports 82 and 84 are in radial alignment. The sleeve 80 has outlet ports indicated at 86.

Figures 5, 6, 7:
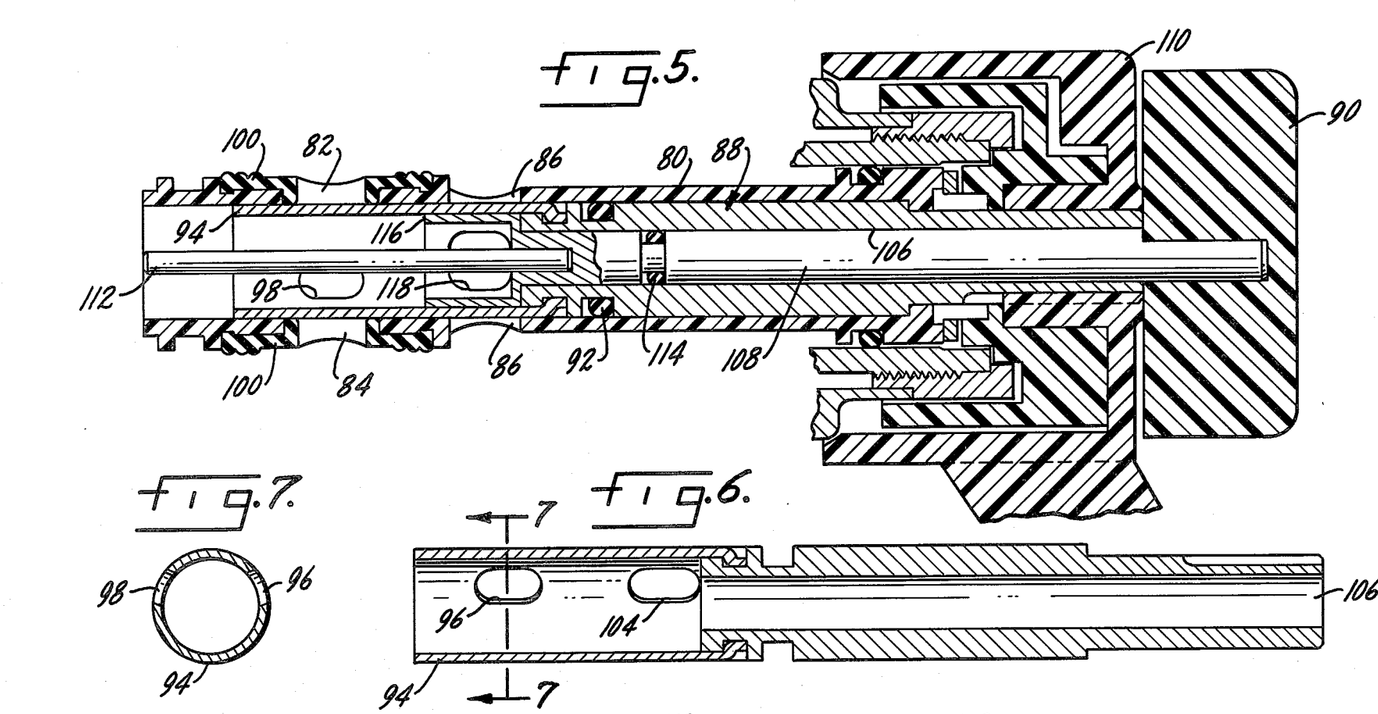
FIG. 5 is an axial section of a modified form of valve construction.
FIG. 6 is an axial section through the valve member stem of the FIG. 5 construction.
FIG. 7 is a section view, along plane 7—7 of FIG. 6.
Figure 8:
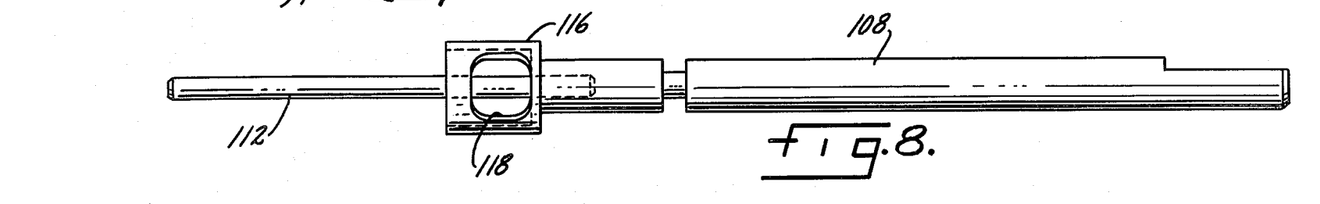
FIG. 8 is a plan view of the volume control member in the FIG. 5 valve construction.

Rotatably positioned within hollow sleeve 80 is a valve member 88, upon which is fastened at the right-hand side a conventional operating lever 110. Valve member 88 has a seal 92 which seals the exterior of the valve member and the interior of the sleeve. A hollow piston 94 is attached to valve member 88, in any conventional manner, and includes, as illustrated in FIGS. 6 and 7, cold and hot water inlet ports 96 and 98 which can be moved into register with cold and hot water inlets 82 and 84. The inlet ports 82 and 84 each have a seal member 100, which is the same in construction as illustrated in the FIGS. 1-4 valve.

Valve member 88 has a pair of outlet ports, one of which is indicated at 104, which ports are in axial alignment with inlet ports 96 and 98. Valve member 88 further has a hollow bore 106 within which is positioned operating shaft 108 of a volume control member, the knob for which is illustrated at 90 in FIG. 5. Shaft 108 extends inside of valve member 88 and has a rod 112 which limits the depth of shaft 108. An O-ring 114 surrounds shaft 108 and seals the shaft to the interior of bore 106 on valve member 88. Shaft 108 carries a cup 116 open at the left-hand side and having a pair of diametrically opposed ports 118. As clearly seen in FIG. 5, ports 118 are generally in radial alignment with outlet ports 86 of the sleeve and outlet ports 104 of the valve member.

Lever 110 and knob 90 can be independently rotated to independently control temperature and volume. Because of the frictional engagement between shaft 108 and valve member 88, rotation of temperature control lever 110 may also rotate the volume control shaft and its associated cup 116.

In operation, the valve is closed when valve member inlet ports 96 and 98 are moved out of register with sleeve inlet ports 82 and 84. To open the valve the valve member is rotated until there is first register with cold water inlet port 82 which will cause cold water to be directed to the interior of the valve member and out of cold water outlet port 104. Normally, the volume control 90 will be so set, once it has been adjusted by the user, that it will not be manipulated for every operation of the valve. Continued rotation of temperature control member 110 will cause the valve member and sleeve hot water ports to become in register providing a substantial degree of valve rotational movement in the so-called "comfort zone" in which there is a mixture of hot and cold water at the valve discharge. Continued rotation in the same direction will provide a full hot water discharge.

Figures 9, 10:
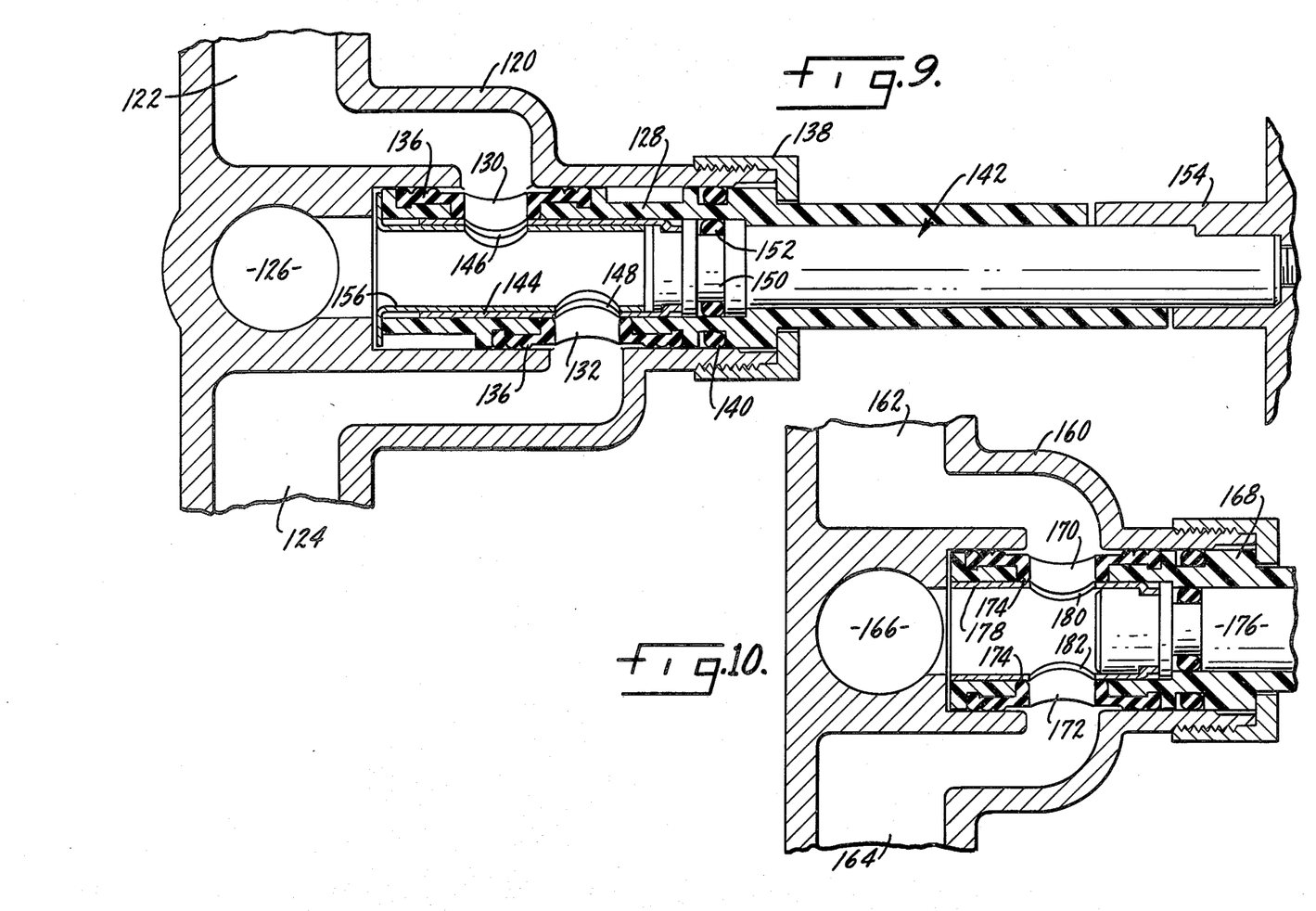
FIG. 9 is an axial section through yet a further embodiment of cycle valve.
FIG. 10 is a partial axial section, showing a modification of the FIG. 9 embodiment.

In the construction illustrated in FIG. 9, a housing 120 has a cold water inlet passage 122 and a hot water inlet passage 124 and a water discharge 126. Positioned within a hollow bore of housing 120 is a sleeve indicated at 128 which has a cold water inlet port 130 and a hot water inlet port 132. Seals 136 are positioned at both the hot and cold water inlets as described above. The sleeve extends outwardly from housing 120 and is held in fixed position within the housing by a collar 138 threadedly attached to the exterior of the housing. A seal ring 140 seals the exterior of sleeve 128 to the interior of housing 120.

Positioned within hollow sleeve 128 is a valve member indicated generally at 142 and having an interior piston 144 with cold and hot water inlet ports 146 and 148, respectively. Piston 144 is attached to a stem 150, the exterior of which is sealed by a seal ring 152 to the interior of sleeve 128. Valve member 142 may have a suitable operating handle 154 attached in a conventional manner to the outward end thereof.

Positioned within valve stem 144 is a cylindrical shear member 156 of the type described in co-pending application Ser. No. 011,405, filed Feb. 12, 1979. The shear member is effective, when piston 144 is rotated relative thereto, to remove or break up any foreign material caught at the inlet ports as well as to provide an early shutoff at valve closure.

The valve member inlet ports are not in alignment which is advantageous in that it provides greater flexibility in the location and shape of the ports permitting variation in temperature design.

The FIG. 10 construction is quite similar to that of FIG. 9 and includes a valve housing 160 having a cold water inlet 162 and a hot water inlet passage 164. There is an outlet 166. In this connection, both the structures illustrated in FIGS. 9 and 10 are known as bottom discharge valves in that the valve member and valve sleeve have coaxially registering open ends which provides communication with the housing outlet passage.

A sleeve 168 has a cold water inlet port 170 and a hot water inlet port 172 with seals 174 being positioned in the manner as described above.

A valve member 176 including a piston 178 having aligned cold and hot water inlet ports 180 and 182 is attached to the stem portion of valve member 176 in the same manner as illustrated in the previously-described embodiments.

The principal difference in the structures of FIGS. 9 and 10 is that FIG. 10 does not include a shear member, such as illustrated at 156 in FIG. 9, and the hot and cold water inlet ports are in radial alignment. Although this arrangement does not have the above-described advantages, it does provide a valve construction which has a substantially shorter axial length than that of the FIG. 9 construction. In both cases, rotation of the valve will first provide cold water flow into the interior of the valve member. Continued counterclockwise rotation of the valve member will provide a mixed water discharge and ultimately, as the valve continues to be rotated by the user, there will be a full hot water discharge. In both cases the valve is fixed against reciprocal movement by the collar 138 of FIG. 9 and a similar collar in the FIG. 10 construction.

Figure 11:
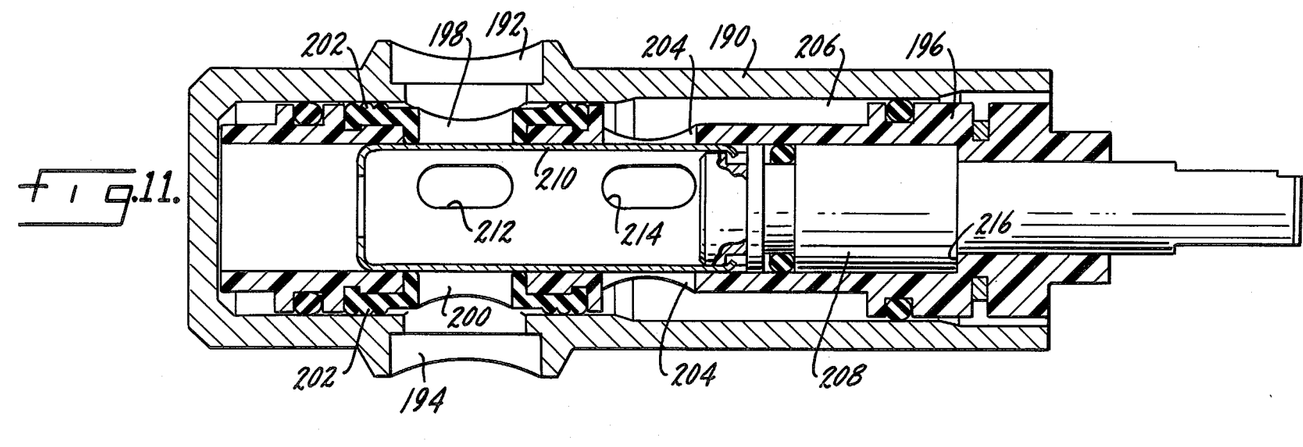
FIG. 11 is an axial section through yet a further modified form of cycle valve.

In the FIG. 11 embodiment there is an exterior housing 190 having a cold water inlet 192 and a hot water inlet 194. The outlet or discharge for the FIG. 11 construction is not illustrated, but will be positioned behind the valve structure positioned within the housing.

A sleeve 196, generally hollow and cylindrical in nature, is positioned within housing 190 and has a cold water inlet 198 and a hot water inlet 200. The hot and cold water inlets are in radial alignment and each will utilize a seal 202 of the type described previously. Sleeve 196 has outlet ports 204, axially spaced from the inlet ports, and positioned to discharge mixed water into an annular chamber 206 which will be in communication with the housing outlet port.

Rotatably positioned within sleeve 196 is a valve member 208 having a piston portion 210 which may be stainless steel or a similar material, and which has a cold water inlet indicated at 212. There will be a second inlet for hot water port 200. The piston has a pair of discharge ports, one of which is indicated at 214, with the discharge ports being axially spaced from the hot and cold water inlets and in axial alignment with sleeve discharge ports 204 for equal inlet/outlet area pressure. This specific construction will also reduce water created noise within the valve. Valve member 208 is rotatable, but held against reciprocal movement by cooperating shoulders 216 on the valve member and sleeve.

Figure 12:
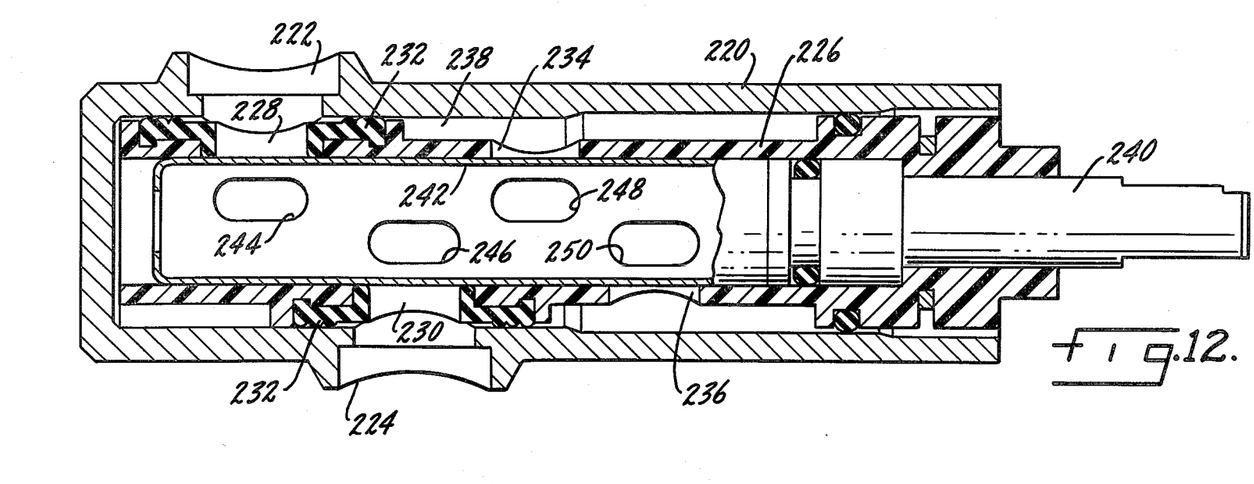
FIG. 12 is a section, similar to FIG. 11, but showing a modification thereof.

In the FIG. 11 construction, the inlets are in radial alignment, permitting a valve member shorter in axial dimension than the to-be-described FIG. 12 construction. The discharge which is not illustrated, is through the side of the valve rather than through the bottom, as illustrated in the FIGS. 8 and 9 construction. Again, rotation of the non-reciprocal valve member will cause it to move from a closed position, to a cold water discharge position, through a position of mixed water discharge, and ultimately to a position of hot water discharge.

In the FIG. 12 construction a housing 220 has a cold water inlet port 222 and a hot water inlet port 224. A sleeve 226 positioned within the housing has a cold water inlet port 228 and a hot water inlet port 230. Both port constructions 228 and 230 include seal members 232. Note that the hot and cold water inlet ports are axially spaced or radially non-aligned.

Sleeve 226 includes a cold water outlet 234 and a hot water outlet port 236 which are also axially spaced or radially non-aligned. Both ports 234 and 236 discharge into an annular space 238 surrounding the sleeve, which space will be in communication with a housing discharge port which is not illustrated.

Reciprocally fixed but rotationally movable within sleeve 226 is a valve member 240 having a piston portion 246. Ports 244 and 246 during rotation of the valve will be moved into and out of register with sleeve inlet ports 228 and 230, respectively.

Piston 242 similarly has a cold water discharge port 248 and a hot water discharge port 250, which ports will be in register with the corresponding sleeve cold and hot water discharge ports simultaneously with the above-described registry of the inlet ports. Again, rotation of the valve member will cause first the cold water inlet and outlet ports to register, with continued rotation placing the valve in a mixed water discharge position and ultimately continued rotation will place the valve member in a position to discharge only hot water.

The principal difference between the FIGS. 11 and 12 constructions is that in FIG. 11 the inlet and outlet ports are radially aligned, whereas, in the FIG. 12 construction the inlet and outlet ports are axially spaced and radially non-aligned, with the latter construction permitting greater flexibility in port configuration.

Figure 13:
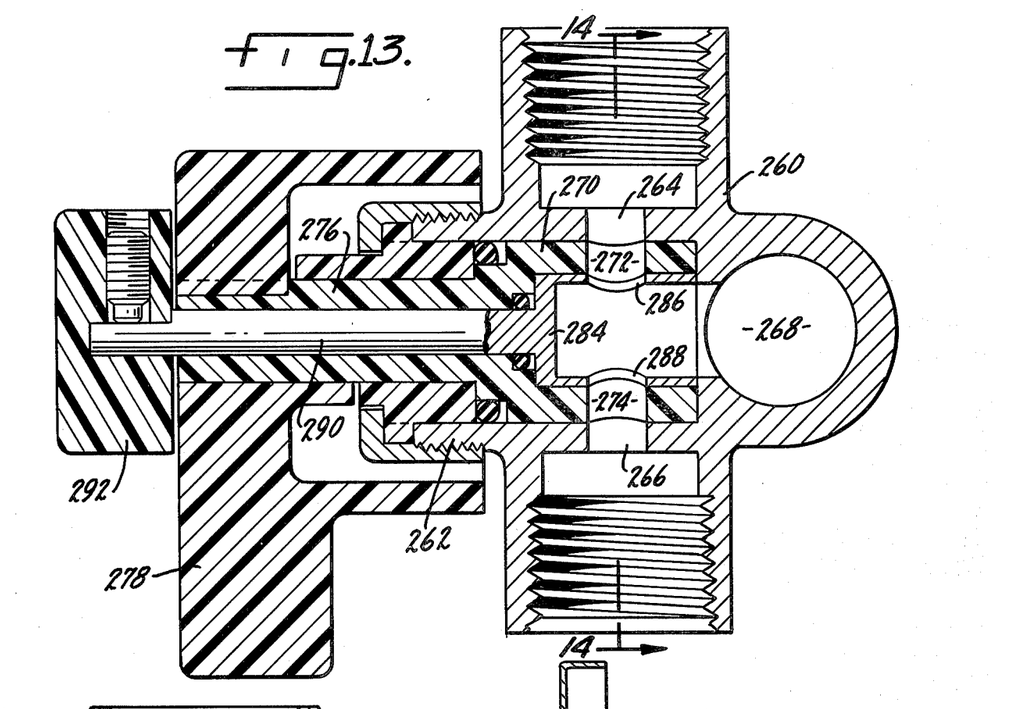
FIG. 13 is an axial section through yet a further embodiment of cycle valve.
Figure 14:
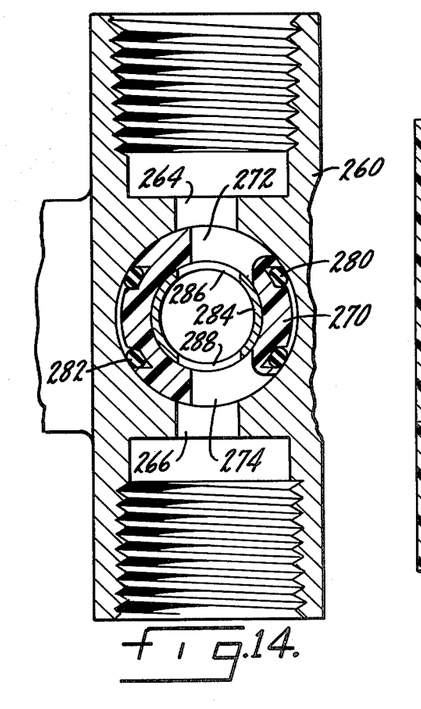
FIG. 14 is a section along plane 14—14 of FIG. 13.

In the cycle valve construction of FIGS. 13 and 14, there is a housing indicated generally at 260 which has a sleeve portion 262 with a hot water inlet port 264 and a cold water inlet port 266. Both ports 264 and 266 are in register with threaded passages which will conventionally be used to attach the housing or body into a plumbing configuration. A discharge port or discharge passage is indicated at 268.

Positioned within hollow sleeve portion 262 of the valve housing 260 is a rotatable valve member 270 having a hot water inlet port 272 and a cold water inlet port 274. Note in the FIG. 13 position that the hot and cold water sleeve and valve member ports are in register, whereby water will flow into the interior and out discharge port 268. Valve member 270 has an outwardly-extending stem portion 276 upon which is mounted an operating handle 278.

As particularly illustrated in FIG. 14, the exterior of valve member 270 mounts a pair of seal rings 280 and 282 positioned generally 90° from the inlet ports. To close the valve, the valve member is rotated so that there is registry between seal rings 280 and 282 and the sleeve inlet ports 264 and 266. Thus, in contrast to the earlier-described forms of the valve construction, in the FIG. 13 and 14 configuration the valve closing seal is carried by the movable valve member rather than being positioned on the stationary sleeve.

Positioned within valve member 270 is a volume control cup 284 having hot and cold water inlets 286 and 288, respectively, which can be placed in register with the valve member inlets as particularly illustrated in the FIG. 13 position. When so positioned, the volume control member permits full discharge through port 268. Cup 284 is attached to or integral with a shaft 290 which extends outwardly through a bore within valve stem portion 276 and has an operating handle 292 mounted thereon.

The temperature control member and the volume control member may be independently operated, however, they may be simultaneously rotated due to the friction between the shaft of the volume control member and the interior bore of the temperature control member. The operation is similar to that described in connection with the FIGS. 5–8 construction.

Operation of the valve in terms of providing either hot, cold or a mixed water discharge is similar to that described above. In like manner, the use of the volume control member is similar. What distinguishes the FIGS. 13 and 14 construction from the previous valves is the use of a seal mounted upon the movable valve member rather than a seal stationary on the fixed sleeve. Again, the valve member only rotates and is fixed against reciprocal movement.

Figure 15:
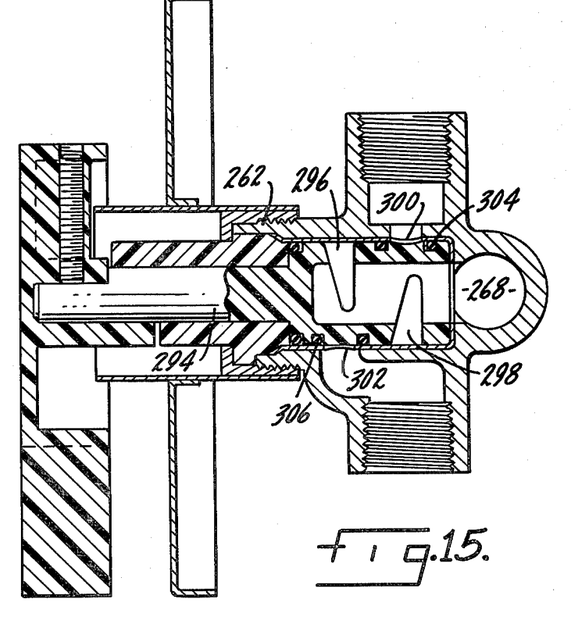
FIG. 15 is an axial section of a modification of the cycle valve of FIGS. 13 and 14.
Figure 16:
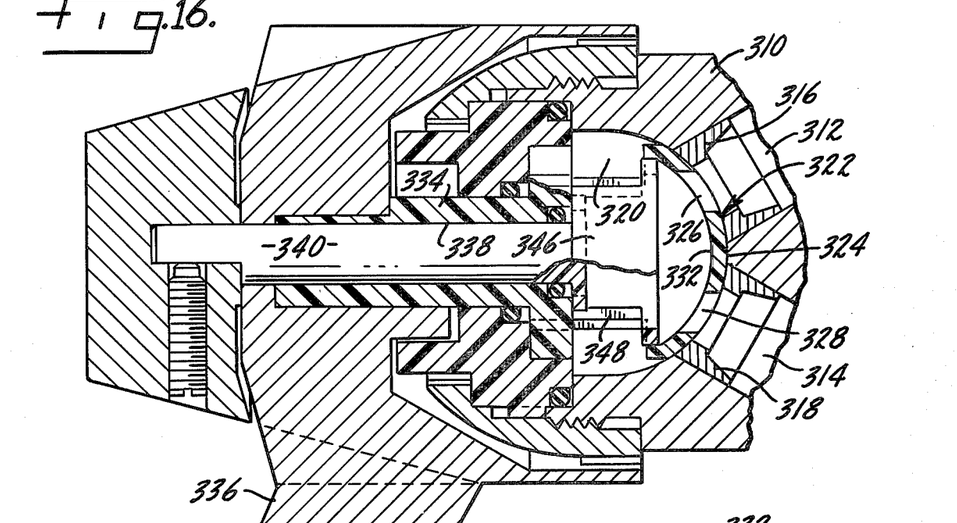
FIG. 16 is an axial section through yet a further modified valve construction.
Figure 17:
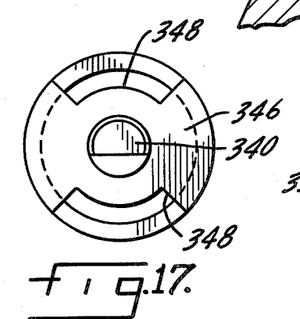
FIG. 17 is an end view of the FIG. 16 volume control, from the left-hand side.
Figure 18:
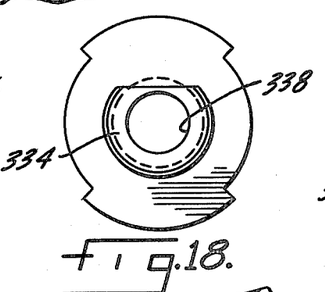
FIG. 18 is an end view of the temperature control stem of the FIG. 16 construction, from the left side.
Figure 19:
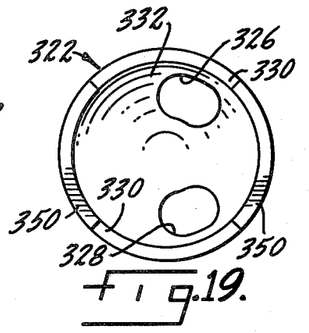
FIG. 19 is an end view of the temperature control seat of the FIG. 16 construction, from the left side.

In the construction of FIG. 15, like parts have been given corresponding numbers. In this case the volume control member has been eliminated and the valve member, indicated at 294, has a hot water inlet 296 and a cold water inlet 298, which ports have a somewhat wedge-shaped configuration to permit water modulation. Note that the valve member inlet and outlet ports are axially spaced or radially non-aligned as are inlet ports 300 and 302 in the housing. The principal difference between the FIG. 15 configuration and that shown in FIGS. 13 and 14 is the axially spaced inlet ports in FIG. 15 contrasted to the in-line inlet ports in the FIGS. 13 and 14 construction. In this same connection, seal rings 304 and 306 carried by the rotatable valve member are axially offset so that they may be placed in alignment with the housing or sleeve inlet ports as described above.

In the valve arrangement of FIGS. 16–19, there is a valve body 310 having a hot water inlet 312 and a cold water inlet 314. Seal members 316 and 318 are positioned within the inlet ports, respectively. Both hot and cold water inlet ports discharge into a generally spherical shaped chamber 320. The discharge from the chamber is not illustrated.

Positioned within chamber 320 is a valve member 322 which has a spherical end surface 324 having a hot water inlet port 326 and a cold water inlet port 328 and discharge slots 330. Note that the inlet ports can be placed in register with body inlet ports 312 and 314 to provide the customary temperature selection of the inflowing water.

The described surface 324 is formed by one end of a cup-shaped member 332 which is attached to a shaft 334 which shaft is rotatable by an exterior knob 336. Such rotation will cause relative movement between the valve member ports and the body ports to control the flow of water through the valve.

Shaft 334 has a bore 338 within which is positioned a shaft 340 which operates a volume control member 346 positioned interiorly of cup 332. The volume control member has a pair of oppositely-positioned arcuate grooves 348, particularly illustrated in FIG. 17, which cooperate with arcuate walls 350 on cup 332, with the latter walls being illustrated in FIG. 19. Rotation of the volume control member relative to the valve member will cause variations in the degree of registry of grooves 348 in member 346 and walls 350 in cup 332 to the end that the volume of water passing from discharge slots 330 to the body member discharge port is varied.

Again, rotation of the valve member will control the temperature of the water discharge. The valve member is fixed against reciprocation and has an internal volume control member which is effective to regulate volume of water discharged.

Figure 20:
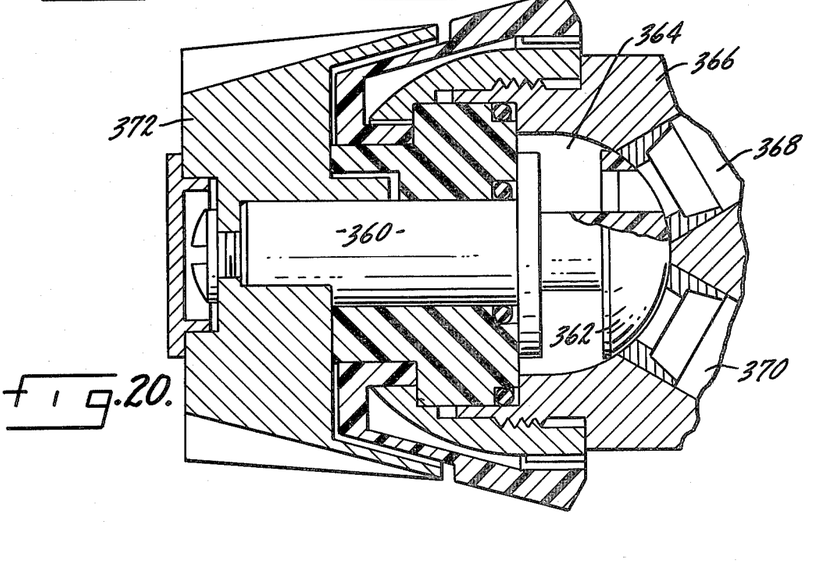
FIG. 20 is an axial section through a modification of the FIG. 15 valve.

The valve construction of FIG. 20 is in most respects similar to that illustrated in FIGS. 15–19 with the exception of the volume control member which has been eliminated. Valve member 360 includes a generally spherically-shaped valve member portion 362 which is movable within a spherical chamber 364 and has inlet ports and a discharge area similar to that of the FIGS. 16-19 construction. Valve housing 366 has a hot water inlet 368 and a cold water inlet 370, with seal members similar to that described above positioned therein. The operation of the FIG. 20 construction, through operating knob 372, is the same as that described in connection with FIGS. 16-19 with the exception that there is no provision for regulating volume of water discharged.

Whereas the preferred form of the invention has been shown and described herein, it should be realized that there may be many modifications, substitutions and alterations thereto.

The embodiments of the invention in which an exclusive property or privilege is claimed are defined as follows:

1. A valve for mixing hot and cold water including a sleeve having axially spaced and radially non-aligned hot and cold water inlets in the side thereof, outlet means in said sleeve intermediate said inlets, a rotatable non-reciprocal valve member positioned within said sleeve to control the mixture of hot and cold water at said sleeve outlet means, said valve member including a hollow stem having hot and cold water inlet and outlet ports therein and a sealless reciprocally movable pressure balancing spool positioned within said stem, said spool and stem providing two spaced chambers, said stem cold water inlet and outlet ports opening into one chamber and said stem hot water inlet and outlet ports opening into the other chamber, with a portion of said chamber walls forming balancing surfaces for said spool, said stem hot and cold water inlet ports partially circumferentially overlapping so that at any open position of said valve member hot and cold water is in communication with both of said spaced chambers to provide balancing pressures thereon, and valve closing seal means positioned on said sleeve and extending through said sleeve hot and cold water inlets for sealing contact with said valve member.

* * * * *